006
United States Patent [19]

Chattha et al.

[11] 4,284,754
[45] Aug. 18, 1981

[54] OLIGOMERIC PHOSPHATE/AMINO COMPOSITION

[75] Inventors: Mohinder S. Chattha, Livonia; Henk vanOene, Detroit, both of Mich.

[73] Assignee: Ford Motor Company, Dearborn, Mich.

[21] Appl. No.: 109,597

[22] Filed: Jan. 4, 1980

[51] Int. Cl.$^3$ .................. C08G 59/40; C08L 63/00
[52] U.S. Cl. .................. 528/107; 525/158; 525/509; 525/510; 528/108; 528/250
[58] Field of Search .................. 525/158, 509, 510; 528/107, 108, 250

[56] References Cited

U.S. PATENT DOCUMENTS

| | | | |
|---|---|---|---|
| 2,541,027 | 2/1951 | Bradley | 528/108 X |
| 2,849,418 | 8/1958 | Fang | 528/108 X |
| 3,651,169 | 3/1972 | Davis | 525/511 |
| 3,960,979 | 6/1976 | Khanna | 525/119 |
| 4,018,848 | 4/1977 | Khanna | 525/510 X |
| 4,178,319 | 12/1979 | Chattha | 525/512 X |
| 4,178,320 | 12/1979 | Chattha | 525/512 X |
| 4,178,321 | 12/1979 | Chattha | 525/512 X |
| 4,178,322 | 12/1979 | Chattha | 525/512 X |
| 4,178,323 | 12/1979 | Chattha | 525/512 X |
| 4,178,324 | 12/1979 | Chattha | 525/512 X |
| 4,181,783 | 1/1980 | Chattha | 525/161 |
| 4,181,784 | 1/1980 | Chattha et al. | 525/161 |
| 4,181,785 | 1/1980 | Chattha et al. | 525/161 |
| 4,184,025 | 1/1980 | Chattha | 525/161 |
| 4,196,270 | 4/1980 | Chattha | 525/511 X |

*Primary Examiner*—Earl A. Nielsen
*Attorney, Agent, or Firm*—Roger L. May; Olin B. Johnson

[57] ABSTRACT

A thermosetting composition particularly suitable as a high solids coating composition for automotive applications. Exclusive of pigments, solvents and ether non-reactive components, the composition consists essentially of: (A) an oligomeric hydroxy functional phosphate ester having a number average molecular weight of between about 500 and about 5000 and being prepared by reaction of a polyepoxide and an acid phosphate ester; (B) up to 50 weight percent of a hydroxy functional compound; and (C) between about 15 and about 50 weight percent of an amine aldehyde crosslinking agent.

8 Claims, No Drawings

OLIGOMERIC PHOSPHATE/AMINO COMPOSITION

BACKGROUND OF THE INVENTION

This invention relates to compositions of the type comprising a crosslinkable film forming or matrix forming component and an amino crosslinking agent therefor. More particularly, the invention relates to thermosetting compositions of the aforementioned type wherein the cross-linkable film forming or matrix forming component is an oligomeric hydroxy functional phosphate ester and the crosslinking agent is an amine aldehyde compound. Compositions within the scope of the invention are particularly useful as coating compositions, most particularly as high solids coating compositions.

Because of increasingly strict solvent emissions regulations in recent years, low solvent emission paints have become very desirable. A number of high solids paint compositions have been proposed to meet these low solvent emission requirements. However, many of these compositions are deficient because of difficulty in application, slow curing rates, lack of flexibility, poor durability and low solvent and water resistance. Many of the proposed compositions have been particularly deficient as automotive topcoats, particularly when the topcoat is to include metallic flake as a pigment.

The deficiency in compositions including metallic flake results from undesired reorientation of metallic flake during application and curing of the coating. The flake reorientation results primarily because of the very low viscosity resins used in the paint compositions to accommodate high solids. The low thixotropy is not sufficient to immobilize the flakes which tend to redistribute themselves to show "reverse flop" and nonuniform distribution.

It has now been discovered that a novel class of hydroxy functional organophosphorous oligomeric esters are particularly suitable for the preparation of compositions which are crosslinked by amine aldehyde compounds. These compositions, which are particularly suited as coating compositions, afford high solids, low application viscosity, low bake coatings with excellent hardness, adhesion, gloss, solvent resistance, impact strength and elongation.

SUMMARY OF THE INVENTION

The compositions of the invention are thermosetting compositions which may contain greater than about 55 percent by weight of nonvolatile solids, preferably greater than about 60 percent by weight. The compositions are capable of curing rapidly at low temperature. Exclusive of pigments, solvents and other nonreactive components, the compositions consist essentially of: (A) an oligomeric hydroxy functional phosphate ester having a number average molecular weight of between about 500 and about 5000 and being prepared by reaction of a polyepoxide and a phosphate ester; (B) up to about 50 weight percent based on the total weight of reactive components of a hydroxy functional compound having a number average molecular weight of between about 120 and about 4000; and (C) an amine aldehyde crosslinking agent in an amount ranging from about 15 to about 50 weight percent based on the total weight of reactive components in the composition.

RELATED APPLICATIONS

United States Patent Application Ser. No. 109,600 now U.S. Pat. No. 4,259,472 issued Mar. 31, 1981 filed concurrently herewith and entitled "Two Component Oligomeric Phosphate/Isocyanate Composition" teaches and claims a thermosetting composition employing an oligomeric hydroxy functional phosphate ester prepared in a manner similar to the oligomeric hydroxy functional phosphate ester of the subject application. The compositions disclosed therein are useful as high solids coating compositions as well as compositions for molding applications, particularly reaction injection molding applications. Those compositions employ polyisocyanate crosslinking agents. U.S. Application Ser. Nos. 945,030 and 945,031 filed Sept. 22, 1978 and entitled "High Solids Coating Composition Adapted For Use As Automotive Topcoat—#1 and #2" respectively disclose and claim high solids coating compositions suitable for automotive applications. Those compositions contain alkyl organophosphate esters similar to those used to prepare the oligomeric hydroxy functional organophosphate esters of the subject invention, as well as an epoxy functional acrylic copolymers and amino compound crosslinking agent.

PRIOR ART

U.S. Pat. Nos. 3,960,979 and 4,018,848 to Khanna teach high solids coating compositions adapted for use as can coating materials. The compositions consist essentially of: (i) aromatic epoxide compositions having two or more epoxy groups on an epoxy resin which has a molecular weight not exceeding 2500; (ii) an amino crosslinking agent; (iii) an inorganic or organic monomeric or polymeric acid which acts as a reactive catalyst; and (iv) a flexibilizing polyol.

The compositions of Khanna have the advantage of quick reaction and low application viscosity, but lack durability and, therefore, do not weather well. As such the compositions of Khanna are not desirable for use as automotive topcoats.

DETAILED DESCRIPTION OF THE INVENTION

As indicated above, the compositions of the subject invention are particularly useful as high solids coating compositions for automotive applications. Each of the components of the compositions of the invention generally summarized above, will be described hereinafter in greater detail.

Oligomeric Hydroxy Functional Phosphate Ester

The oligomeric hydroxy functional phosphate ester which is employed in compositions of the invention has a number average molecular weight of between about 500 and about 5000, preferably between about 1500 and about 2500. As indicated above, the oligomeric phosphate ester is prepared by reaction of a polyepoxide resin and a phosphate acid ester. The oligomeric phosphate ester so formed bears hydroxy functionality which is generated as a result of the reaction of the epoxide functionality with the acid group of the organophosphate ester reactant.

The polyepoxide resin employed in the preparation of the oligomeric phosphate ester has a number average molecular weight of between about 120 and about 4500, preferably between about 150 and about 2000. The polyepoxide is selected from the group consisting of aliphatic, cycloaliphatic and aromatic polyepoxides. As used herein, the term polyepoxide resin is intended to mean compounds or polymers containing two or more epoxide groups. However, di epoxides are most preferred for preparing oligomeric hydroxy functional phosphate esters used in compositions of the invention.

Among the numerous polyepoxide resins useful in preparing the oligomeric hydroxy functional phosphate esters are well known aliphatic, cycloaliphatic and aromatic polyepoxides, many of which are disclosed by U.S. Pat. Nos. 3,404,018; 2,528,359; 2,528,360; 3,198,850, 3,960,979; and 4,018,848.

U.S. Pat. No. 3,404,018 discloses several particularly suitable types of polyepoxides including: (1) polyglycidyl ethers of polyhydric alcohols and polyhydric phenols; (2) epoxidized esters of polyethylenically unsaturated monocarboxylic acids; (3) glycidyl ethers of polybasic acids; (4) epoxidized esters of unsaturated monohydric alcohols and carboxylic acids; and (5) epoxidized polymers and copolymers of diolefins. Of course, many polyepoxides other than those recited in this or other referenced patents will be apparent to those skilled in the art.

The phosphate ester used in the preparation of the oligomeric hydroxy functional phosphate ester of the composition is itself an acid phosphate ester having the formula:

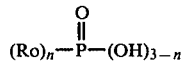

$$(Ro)_n-P-(OH)_{3-n}$$

with O double-bonded to P.

wherein $n=1$ to 2 and R is selected from alkyl and aryl groups containing about 1 and about 20 carbon atoms, preferably, between about 2 and about 8 carbon atoms. Exemplary of the suitable alkyl and aryl groups which may be employed in the mono or diesters described above are: ethyl, propyl, pentyl, hexyl, 2-ethylhexyl, heptyl, octyl, phenyl, p-methyl phenyl, stearyl, etc.

In the preparation of the oligomeric hydroxy phosphate esters of the compositions of the invention, the acid phosphate ester and the polyepoxide resin are reacted in amounts such that there are between about 0.7 and about 1.1, preferably between about 0.8 and about 1 acid group per epoxy group in the reaction mixture. Because the acid phosphate reactant acts as a catalyst for the hydroxyl/amino crosslinking action of the compositions of the invention, it is permissible, and in many cases desirable, to include an excess of the organophosphate ester reactant so as to catalyze the crosslinking reaction. As will be noted from the above amounts of acid phosphate ester and epoxy employed in the preparation of the oligomeric hydroxy functional phosphate ester, it is possible to employ less than that amount of acid which would be stoichiometrically necessary to either react all epoxy or to provide an excess of acid to be used as a ctalyst. Initially, after the acid phosphate ester and the polyepoxide are combined, a rather rapid reaction takes place and then the acid concentration reaches an almost constant level. Since an excess of epoxy appears to be consumed, it may be doing so through acid catalyzed self-condensation to produce hydroxy ether phosphates. However, the presence of ether linkages have not been confirmed from infrared spectra of the acid-epoxy adducts. The excess acid may be resulting from hydrolysis of the adduct by ambient moisture. In any event, the important consideration is that sufficient acid phosphate be included to react substantially all the epoxy functionality on the polyepoxide resin and desirably in such amounts so as to provide an excess of acid functionality which serves to catalyze the hydroxyl/amino reaction.

A second major reactive component of the compositions of the invention is an optional hydroxy functional compound having a number average molecular weight of between about 120 and about 4000. This hydroxy functional compound may be included in the composition in an amount up to 50 weight percent based on the total weight of the reactive components of the composition. This compound provides additional hydroxy functionality other than that present on the oligomeric hydroxy functional phosphate ester and is preferably employed in amounts ranging from about 10 to about 50 weight percent of the total weight of reactive components in the composition.

By providing additional hydroxy functionality, these additives help bring about a more desired crosslinked structure in the final cured product.

Numerous hydroxy functional compounds for use in compositions of the invention will be apparent to those skilled in the art. Suitable hydroxy functional materials are disclosed in the aforementioned Khanna patents as well as in U.S. Pat. No. 4,178,321 issued Dec. 11, 1979. Among the numerous suitable materials which may be employed are (i) hydroxy functional polyesters, (ii) hydroxy functional polyethers, (iii) hydroxy functional oligoesters, (iv) monomeric polyols and (v) hydroxy functional copolymers formed from monoethylenically unsaturated monomers, one or more of whch bears hydroxyl functionality and which is included in the copolymer in amounts ranging from about 2.5 to about 30 weight percent of the copolymer.

Amine Aldehyde Crosslinking Agent

Amine aldehyde crosslinking agents suitable for crosslinking hydroxyl bearing materials in accordance with the invention are well known in the art and their selection will be obvious to those skilled in the art.

These crosslinking agents in general, comprise the condensation product of an amino compound with an aldehyde or aldehyde precursor. Exemplary of these types of material are a urea-formaldehyde condensate or a triazine, e.g., melamine formaldehyde condensate. Exemplary of other materials within the very broad class of crosslinking agents contemplated are condensation reaction products of formaldehyde with substituted melamine, benzoguanamine and substituted benzoguanamine.

Preferred members of the broad class of crosslinking agents are alkylated melamine and urea-formaldehyde resins. Particularly preferred are methylated melamine-formaldehyde resins such as hexamethoxymethylmelamine. These liquid crosslinking agents have substantially 100 percent non-volatile content as measured by the foil method at 45° C. for 45 minutes. Some particularly well known crosslinking agents are amino resins sold by American Cyanamid under the trademark "Cymel". In particular, Cymel 301, Cymel 303 and Cymel 1156, all alkylated melamine-formaldehyde resins are useful in compositions falling within the scope of this invention.

For further discussion of the amine-aldehyde crosslinking agents, see U.S. Pat. Nos. 2,222,506; 2,226,518; 2,227,223; 2,227,708; 2,322,979; 2,327,984; 2,323,357; 3,326,265; 3,269,994; 3,414,635; 3,865,683; 4,083,830; 4,083,892; 4,137,389.

The amount of crosslinking agent employed in compositions of the invention ranges from between about 15 and about 50 weight percent based on the total weight of reactive components of the composition.

Other Materials

In addition to the above discussed reactive components, other materials may be included in the compositions of the invention. These include materials such as catalysts, antioxidants, U.V. absorbers, solvents, surface modifiers and wetting agents as well as pigments. The solvents used in coating compositions in the invention are those which are commonly used. Typical solvents useful in coating compositions facilitate spray application at high solids content and include toluene, xylene, methyl ethyl ketone, acetone, 2-ethoxy-1-ethanol, 2-butoxy-1-ethanol, diacetone alcohol, tetrahydrofuran, ethyl acetate, dimethyl succinate, dimethyl glutarate, dimethyl adipate or mixtures thereof.

Surface modifiers or wetting agents are common additives for liquid paint compositions. The exact mode of operation of these surface modifiers is not known, but it is though that their presence contributes to better adhesion of the coating composition to the surface being coated and helps formation of thin coaings, particularly on metal surfaces. These surface modifiers are exemplified by acrylic polymers containing 0.1–10 percent by weight of copolymerized monoethylenically unsaturated carboxylic acid such as methacrylic acid, acrylic acid or itaconic acid, cellulose acetate butyrate, silicon oils or mixtures thereof. Of course, the choice of surface modifiers or wetting agent is dependent upon the type of surface to be coated and the selection of the same is clearly within the skill of the artisan.

The compositions of the invention may also include pigments. As noted above, high solids compositions of the invention are particularly useful when the coating composition includes metallic flake as a pigment. The rapid set and curing of the composition eliminates problems associated with redistribution of the metallic flake. The amount of pigment in the high solids coating composition may vary, but preferably is between about 3 and about 45 weight percent based on the total weight of the paint composition. If the pigment is metallic flake, the amount ranges from about 1 to about 7 weight percent.

The invention will be further understood by referring to the following detailed examples. It should be understood that the specific examples are presented by way of illustration and not by way of limitation. Unless otherwise specified, all references to "parts" is intended to mean parts by weight.

EXAMPLE 1

In a four-necked round bottom flask equipped with a dropping funnel, a stirrer and a thermometer, 241 grams of bis-(3,4-epoxy-6-methylcyclohexylmethyl) adipate (Araldite CY 178) in 108 ml of n-butyl acetate are placed under nitrogen. Butyl acid phosphate (1+2a), 119 grams, is taken up in the dropping funnel and is added dropwise with continuous stirring. An exothermic reaction occurs, the temperature is allowed to rise to 60° C. and then the addition is regulated to maintain this temperature. After the addition is complete, the reaction mixture is stirred for one hour while maintaining the temperature at 60° C. The molecular weight of the product is determined by Gel Permeation Chromatography (FIG. 1) and is found to be 1950.

Seventy-five parts of the above adduct are dissolved in 42 parts of n-butyl acetate and 27 parts of Cymel 301 are added to it. The resulting formulation is applied by spraying to primed steel panels which are baked at 135° C. for 20 minutes to obtain coatings with excellent hardness, adhesion and solvent (xylene and methyl ethyl ketone) resistance.

EXAMPLE 2

One hundred and ten parts of the adduct from Example 1 are dissolved in 140 parts of methyl amyl ketone and 455 parts of titanium dioxide are added under agitation to this solution. The resulting mixture is whipped with a Cowl's blade at 90 cycles per second for 15 minutes to obtain a Hegman grind fineness of 7.5. The resulting mill base is filtered through a coarse filtering cloth.

Forty-five parts of the above millbase, 31 parts of the adduct from Example 1, and 21 parts of Cymel 301 are mixed with 19 parts of butyl acetate. The resulting formulation is applied by spraying to primed steel panels which are baked at 140° C. for 20 minutes to obtain coatings with excellent hardness, adhesion and solvent (xyelen and methyl ethyl ketone) resistance.

EXAMPLE 3

Preparation of the hydroxy resin is carried out as described in Example 1 by employing 235 parts of bis-(3,4-epoxy-6-methylcyclohexylmethyl) adipate (Araldite Cy178), 160 parts of 2-ethylhexyl phosphate (eq. wt. 150) and 108 parts of n-butyl acetate.

Fifty-five (55) parts of the above adduct and 23 parts of Cymel 301 are dissolved in 18 parts of butyl acetate and the resulting formulation is applied by spraying to primed steel test panels which are baked at 135° C. for 20 minutes to obtain coatings with excellent hardness, adhesion and solvent resistance.

EXAMPLE 4

Seven parts of aluminum flakes (65% in naphtha) are added to the composition described in Example 1 and the resulting formulation is applied by spraying to primed steel panels. The panels are baked at 135° C. for 20 minutes to obtain silver metallic coatings with excellent hardness, adhesion and solvent (xylene and methyl ethyl ketone) resistance.

EXAMPLE 5

One hundred and twenty (120) grams of 1,4-butanediol diglycidyl ether are dissolved in 80 grams of butyl acetate and reacted with 149 grams of 2-ethylhexyl phosphate (eq. wt. 150) as described in Example 1.

Fifty (50) parts of the above adduct and 23 parts of Cymel 301 are dissolved in 18 parts of n-butyl acetate and the resulting formulation is applied by spraying to primed steel panels. The panels are baked at 132° C. for 20 minutes to obtain coatings with excellent hardness, adhesion and solvent (xylene and methyl ethyl ketone) resistance.

EXAMPLE 6

Five (5) parts of caprolactone based hydroxy ester PCP-0300 (Union Carbide), 3 parts of hexabutoxymethyl melamine (Cymel 1156) and 4 parts of methyl amyl ketone are added to the formulation described in Example 1. The resulting formulation is applied by spraying to primed steel panels which are baked at 135°

C. for 20 minutes to obtain coatings with excellent hardness, adhesion, gloss and solvent resistance.

EXAMPLE 7

Seven (7) parts hydroxy polymer OL-42 (Rohm & Haas Chem. Co.) and 4 parts of ethoxymethoxy benzoguanamine (Cymel 1123) are added to the formulation described in Example 2. The resulting formulation is applied by spraying to primed steel panels which are baked at 135° C. for 20 minutes to obtain hard, glossy coatings with excellent adhesion and solvent (xylene and methyl ethyl ketone) resistance.

EXAMPLE 8

A hydroxy acrylic copolymer is prepared from the following monomers:

|  | Wt. Grams |
|---|---|
| Butyl methacrylate | 500 |
| Hydroxypropyl methacrylate | 250 |
| Methyl methacrylate | 200 |
| Styrene | 50 |

Fifty (50) grams tert-butyl perbenzoate is added to the above monomer mixture and the resulting solution is added dropwise to 750 grams of refluxing methyl amyl ketone under nitrogen. The heating and stirring is continued for half an hour after the addition is complete and then two grams of tert-butyl perbenzoate are added portionwise to the reaction mixture. The reaction mixture is refluxed for an additional half an hour and is then allowed to cool to room temperature.

Fifty (50) parts of the above polymer solution and seventy parts of the adduct from Example 1 are dissolved in 42 parts of butyl acetate and 32 parts of Cymel 301 are added to it. The resulting formulation is applied by spraying to primed steel panels which are baked at 132° C. for 20 minutes to obtain coatings with excellent hardness, adhesion and solvent resistance.

EXAMPLE 9

Preparation of hydroxy oligophosphate was carried out as described in Example 1 by employing 120 grams Araldite CY-178, 50 ml n-butyl acetate and 117 grams phenyl acid phosphate.

Sixty-five (65) parts of the above solution, 12 parts of Cymel 301 and 7 parts of butoxymethyl urea resin (Beetle 80, American Cyanamid) are dissolved in 21 parts of n-butyl acetate. The resulting formulation is applied by spraying to primed steel panels which are baked at 137° C. for 20 minutes to obtain coatings with excellent hardness, adhesion and solvent (xylene and methyl ethyl ketone) resistance.

EXAMPLE 10

Preparation of hydroxy oligophosphate is carried out as described in Example 1 by employing 190 grams of bisphenol-A diglycidyl ether (Epon 828), 90 ml n-butyl acetate and 110 grams of butyl acid phosphate.

Fifty-two (52) parts of the above solution, 5 parts of bis-(hydroxypropyl) azelate and 23 parts of Cymel 301 are dissolved in 26 parts of n-butyl acetate. The resulting formulation is applied by spraying to primed steel panels which are baked at 135° C. for 20 minutes to obtain coatings with excellent hardness, adhesion and solvent (xylene and methyl ethyl ketone) resistance.

In view of this disclosure, any modifications of this invention will be apparent to those skilled in the art. It is intended that all such modifications that fall within the true scope of this invention be included within the terms of the appended claims.

We claim:

1. A thermosetting composition which exclusive of pigments, solvents and other nonreactive components consists essentially of:
   (A) an oligomeric hydroxy functional phosphate ester having a number average molecular weight of between about 500 and about 5000 and being prepared by reaction of:
      (i) polyepoxide resin having a number average molecular weight of between about 120 and about 4500 and being selected from the group consisting of aliphatic, cycloaliphatic and aromatic polyepoxides; and
      (ii) acid phosphate ester having the formula

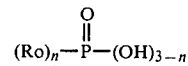

wherein n = 1 to 2 and R is selected from alkyl and aryl groups containing between about 1 and about 20 carbon atoms,
   said acid phosphate ester and said polyepoxide being reacted in such amounts that there are between about 0.7 and about 1.1 acid groups per epoxy group in said reaction mixture;
   (B) up to about 50 weight percent based on the total weight of components (A), (B) and (C) of a hydroxy functional compound having a number average molecular weight of between about 120 and about 4000; and
   (C) an amine aldehyde crosslinking agent in an amount ranging from about 15 to about 50 weight percent based on the total weight of (A), (B) and (C).

2. A composition in accordance with claim 1 wherein oligomeric hydroxy functional phosphate ester has a number average molecular weight of between about 1500 and about 2500 and said polyepoxide used to prepare said oligomeric hydroxy functional phosphate ester is a diepoxide.

3. A composition in accordance with claim 2 wherein said polyepoxide used to prepare said oligomeric hydroxy functional phosphate ester is a cycloaliphatic diepoxide.

4. A composition in accordance with claim 1 wherein said R group of said phosphate ester used to prepare said oligomeric hydroxy functional phosphate ester is selected from alkyl and aryl groups containing between about 2 and about 8 carbon atoms.

5. A composition in accordance with claim 1 wherein said acid phosphate ester and said polyepoxide used to prepare said oligomeric hydroxy functional phosphate ester are reacted in such amounts that there are between about 0.8 and about 1 acid groups per epoxy group in said reaction mixture.

6. A composition in accordance with claim 1 wherein said hydroxy functional compound is selected from the group consisting of (i) hydroxy functional polyesters, (ii) hydroxy functional polyethers, (iii) hydroxy functional oligoesters, (iv) monomeric polyols, and (v) hydroxy functional polymers formed from monoethylenically unsaturated monomers, one or more of which bears hydroxyl functionality and which is included in said copolymer in an amount ranging from about 2.5 to about 30 weight percent of said copolymer.

7. A composition in accordance with claim 1 wherein said amine-aldehyde crosslinking agent is selected from the group consisting of condensation products of formaldehyde with melamine, substituted melamine, urea, benzoguanamine, and substituted benzoguanamine, and mixtures of said condensation products.

8. A composition in accordance with claim 1 wherein said hydroxy functional compound is included in said composition in an amount ranging from about 10 to about 50 weight percent based on the total weight of (A), (B) and (C).

* * * * *